United States Patent
Perroni et al.

(10) Patent No.: US 12,158,055 B2
(45) Date of Patent: Dec. 3, 2024

(54) METHODS FOR SHORTENING WAITING-ON-CEMENT TIME IN A SUBTERRANEAN WELL

(71) Applicant: Schlumberger Technology Corporation, Sugar Land, TX (US)

(72) Inventors: Dominic Perroni, Houston, TX (US); Bipin Jain, Sugar Land, TX (US); Anatoly Medvedev, Cambridge (GB); Carlos Abad, Houston, TX (US); Christopher Daeffler, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/252,852

(22) PCT Filed: Nov. 10, 2021

(86) PCT No.: PCT/US2021/072321
§ 371 (c)(1),
(2) Date: May 12, 2023

(87) PCT Pub. No.: WO2022/104335
PCT Pub. Date: May 19, 2022

(65) Prior Publication Data
US 2024/0003222 A1   Jan. 4, 2024

Related U.S. Application Data

(60) Provisional application No. 63/113,408, filed on Nov. 13, 2020.

(51) Int. Cl.
*E21B 33/14*   (2006.01)
*C09K 8/42*   (2006.01)
(Continued)

(52) U.S. Cl.
CPC .............. *E21B 33/14* (2013.01); *C09K 8/428* (2013.01); *C09K 8/473* (2013.01); *E21B 36/008* (2013.01)

(58) Field of Classification Search
CPC ...................................................... E21B 33/13
See application file for complete search history.

(56) References Cited

U.S. PATENT DOCUMENTS

| 4,921,537 A | 5/1990 | Horiguchi et al. |
| 5,613,558 A | 3/1997 | Dillenbeck, III |

(Continued)

FOREIGN PATENT DOCUMENTS

EP   2090560 A1   8/2009

OTHER PUBLICATIONS

International Search Report and Written Opinion issued in International Patent application PCT/US2021/072321 on Feb. 23, 2022, 11 pages.

(Continued)

*Primary Examiner* — William D Hutton, Jr.
*Assistant Examiner* — Avi T Skaist
(74) *Attorney, Agent, or Firm* — Jeffrey D. Frantz

(57) ABSTRACT

Methods for shortening the waiting-on-cement (WOC) time during primary and remedial cementing operations are disclosed. A fluid pill is injected into the wellbore that comprises reactants. The reaction is accelerating hydration and shortening the time necessary for the slurry to set and harden.

13 Claims, 12 Drawing Sheets

(51) Int. Cl.
*C09K 8/473* (2006.01)
*E21B 36/00* (2006.01)

(56) References Cited

U.S. PATENT DOCUMENTS

| | | | |
|---|---|---|---|
| 6,554,071 B1 | 4/2003 | Reddy et al. | |
| 7,624,743 B2 | 12/2009 | Sarkar et al. | |
| 2005/0194190 A1* | 9/2005 | Becker | E21B 33/138 |
| | | | 175/320 |
| 2013/0126177 A1 | 5/2013 | Brannon et al. | |
| 2015/0000912 A1* | 1/2015 | Choudhary | E21B 43/24 |
| | | | 166/300 |
| 2018/0230358 A1* | 8/2018 | Jain | E21B 33/14 |
| 2023/0126439 A1* | 4/2023 | Pisklak | C04B 28/04 |

OTHER PUBLICATIONS

Davies, D. R. et al., Field Appliation of In-Situ Nitrogen Gas Generation System, SPE-9653-MS, presented at the Middle East Technical Conference and Exhibition, Bahrain, 1981, 10 pages.

Graifer, V. et al., "Bottom-hole Formation Zone Treatment using Monofuel Thermolysis", SPE-138077, prepared for presentation at the 2010 SPE Russian Oil Gas Technical Conference and Exhibition held in Moscow, Russia, 2010, 3 pages.

Mitchell, T. I. et al., Field Application of a Chemical Heat and Nitrogen Generating System, SPE-12776-MS, presented at the SPE Regional Meeting, Long Beach, California, 1984, 7 pages.

Vershinin, V. et al., "Control Methods of Propellant Fracturing for Production Stimulation", SPE-187691-MS, prepared for presentation at the SPE Russian Petroleum Technology Conference held in Moscow, Russia, 2017, 14 pages.

Vershinin, V. et al., "Mechanisms of Thermal-Pressure Induced Impact of Binary Mixture Reaction Near Wellbore", SPE-182048-MS, parepared for presentation at the SPE Russian Petroleum Technology Conference held in Moscow, Russia, 2016, 13 pages.

Leugemors, E. et al.: "Cementing Equipment and Casing Hardware," in Nelson EB and Guillot D (eds.): Well Cementing-2nd Edition, Houston, Schlumberger (2006), pp. 343-458.

Piot, B. et al., "Primary Cementing Techniques," in Nelson EB and Guillot D (eds.): Well Cementing—2nd Edition, Houston, Schlumberger (2006), pp. 459-501.

\* cited by examiner

METHODS FOR SHORTENING WAITING-ON-CEMENT TIME IN A SUBTERRANEAN WELL

This is a National Stage Entry and claims benefit of PCT Patent Application No. PCT/US2021/072321, entitled "METHODS FOR SHORTENING WAITING-ON-CEMENT TIME IN A SUBTERRANEAN WELL," and filed on Nov. 10, 2021, which claims the benefit of U.S. Provisional Patent Application No. 63/113,408, entitled "METHODS FOR SHORTENING WAITING-ON-CEMENT TIME IN A SUBTERRANEAN WELL," and filed on Nov. 13, 2020.

TECHNICAL FIELD

The present disclosure relates generally to cementing operations. In particular, the disclosure relates to methods for heating portions of a subterranean well for the purpose of accelerating the hydration of a hydraulic cement, thereby shortening the waiting-on-cement (WOC) time.

BACKGROUND

During the construction of underground wells, it is common, during and after drilling, to place a tubular body such as a liner or casing, secured by cement pumped into the annulus around the outside of the tubular body. The cement serves to support the tubular body and to provide isolation of the various fluid-producing zones through which the well passes. This latter function prevents cross-contamination of fluids from different layers. For example, the cement prevents formation fluids from entering the water table and polluting drinking water, or prevents water from passing into the well instead of oil or gas. Furthermore, the cement sheath helps prevent corrosion of the tubular body.

The cement placement process is known in the industry as primary cementing. Most primary cementing operations employ the two-plug cement-placement method. FIG. 1 shows a typical wellsite configuration 100 for a primary cementing operation. A cementing head 101 is situated on the surface, and a casing string 103 is lowered into a borehole 102. As the casing string 103 is lowered into the borehole 102, the casing string interior fills with drilling fluid 108. The casing string is centered in the borehole by centralizers 104 attached to the outside of the casing string. Centralizers are placed in critical casing sections to prevent sticking while the casing is lowered into the well. In addition, they keep the casing string in the center of the borehole to help ensure placement of a uniform cement sheath in the annulus between the casing and the borehole. The bottom end of the casing string is protected by a guide shoe 105 and a float collar 109. Guide shoes are tapered, commonly bullet-nosed devices that guide the casing toward the center of the hole to minimize hitting rough edges or washouts during installation. The guide shoe differs from the float collar in that it lacks a check valve. The check valve in a float collar can prevent reverse flow, or U-tubing, of fluids from the annulus into the casing. Inside the cementing head 101 are a bottom cementing plug 106 and a top cementing plug 107. The cementing plugs, also known as cementing wiper plugs or wiper plugs, are elastomeric devices that provide a physical barrier between different fluids as they are pumped through the casing string interior. Most cementing plugs are made of a cast aluminum body with molded rubber fins that ensure steady movement through a tubing.

The goals of the primary cementing operation are to remove drilling fluid from the casing interior and borehole, place a cement slurry in the annulus, and leave the casing interior filled with a displacement fluid such as brine or water. The bottom cementing plug 106 separates the cement slurry from the drilling fluid, and the top cementing plug 107 separates the cement slurry from the displacement fluid.

Cement slurries and drilling fluids are usually chemically incompatible. Commingling may result in a thickened or gelled mass at the interface that would be difficult to remove from the wellbore, possibly preventing the placement of a uniform cement sheath throughout the annulus. Therefore, in addition to using wiper plugs, engineers employ chemical means to maintain fluid separation. Chemical washes and spacer fluids may be pumped between the cement slurry and drilling fluid. These fluids have the added benefit of cleaning the casing and formation surfaces, which is helpful for achieving good bonding with the cement.

FIG. 2 shows a chemical wash 201 and a spacer fluid 202 being pumped between the drilling fluid 108 and the bottom cementing plug 106. Cement slurry 203 follows the bottom cementing plug. The bottom cementing plug has a membrane that ruptures when it lands at the bottom of the casing string, allowing cement slurry to pass through the bottom cementing plug and enter the annulus (FIG. 3).

Once a sufficient volume of cement slurry has been pumped to fill the annular region between the casing string and the borehole wall, the top cementing plug 107 is released, followed by the displacement fluid 301. The top cementing plug 107 does not have a membrane; therefore, when it lands, hydraulic communication is severed between the casing interior and the annulus (FIG. 4). After the cementing operation, engineers wait for the cement to set and develop strength—known as "waiting-on-cement" (WOC). After the WOC time, further operations such as drilling deeper or perforating the casing string may commence.

It should be noted that, under certain circumstances, such as lost circulation during cementing, a "top-up" cementing operation may be performed. This procedure is the pumping of cement slurry down the annulus from the surface.

Conventional cementing plugs are pumped directly from the surface because they pass through only one pipe with a continuous inside diameter (ID). Liners, on the other hand, do not begin at the surface; instead, they are run downhole on the drillstring to the setting depth. Liners typically have a much larger ID than the drillstring; as a result, a single cementing plug cannot be pumped from the surface. Therefore, the displacement is performed by two plugs. One plug, known as the drillpipe dart, is located in the surface cementing equipment. The second plug is either attached to the bottom of the liner setting tool assembly, or the top of the liner setting tool assembly. The second plug is called a liner wiper plug.

After the cement has been pumped in the liner and the drillstring, the drillpipe dart is released from the surface cementing equipment. When the drillpipe dart reaches the top of the liner, it latches into the liner wiper plug. Both the drillpipe dart and the liner wiper plug then become a single divider between the cement slurry and the displacement fluid. This arrangement may be seen in extended-reach wells and multistage cementing applications.

Additional information concerning cementing plugs, drillpipe darts and primary cementing operations may be found in the following publications. Leugemors E et al.: "Cementing Equipment and Casing Hardware," in Nelson E B and Guillot D (eds.): *Well Cementing-2$^{nd}$ Edition*, Houston, Schlumberger (2006) 343-458. Piot B and Cuvillier G: "Primary Cementing Techniques," in Nelson EB and Guillot D (eds.): *Well Cementing*-2nd Edition, Houston, Schlumberger (2006) 459-501.

After placement of the cement slurry is completed, further operations are delayed until the cement sets and hardens. This is known in the art as the "waiting-on-cement" or WOC time. In the art, the WOC time may be defined as the period required for the cement sheath to develop at least 500 psi (0.35 MPa) compressive strength.

A well operator has an economic incentive to minimize WOC time. Rig time can be expensive, particularly in offshore environments, and halting operations wastes time and resources. Excessive WOC times may occur when the depth range of the cement sheath is large. Owing to the geothermal gradient, the temperature at the bottom of the sheath may be significantly higher than that at the top. As a result, the WOC time of the cement slurry at the top may be unacceptably long. WOC times exceeding 24 hours are not uncommon. Furthermore, zonal isolation may be compromised by formation fluids entering the annulus and contaminating the slurry (e.g., gas migration).

Another situation during which WOC time minimization is desirable occurs while cementing shallow conductor casings in offshore wells. Cold temperatures (sometimes near freezing in deepwater environments) may exist in the riser and near the seabed surface. Minimizing the WOC time allows faster release of the conductor casing, and operators may then promptly continue with further operations.

Furthermore, WOC time reduction may be desirable during remedial cementing operations—squeeze cementing and plug cementing.

Long WOC times may be mitigated by incorporating accelerators (e.g., calcium chloride) in the cement slurry; however, in many circumstances, accelerators may be impractical or may adversely affect the physical properties of the cement sheath (e.g., lower compressive strength and higher permeability). This problem is particularly associated with cement sheaths having a large temperature differential between the top and the bottom.

Operators have also employed downhole electric heaters to raise the curing temperature. Such heaters are usually installed in the casing interior adjacent to cooler regions of a long casing string. This method may be costly and complicated because it involves introducing and withdrawing a tool string in the casing.

SUMMARY

Figure 1:
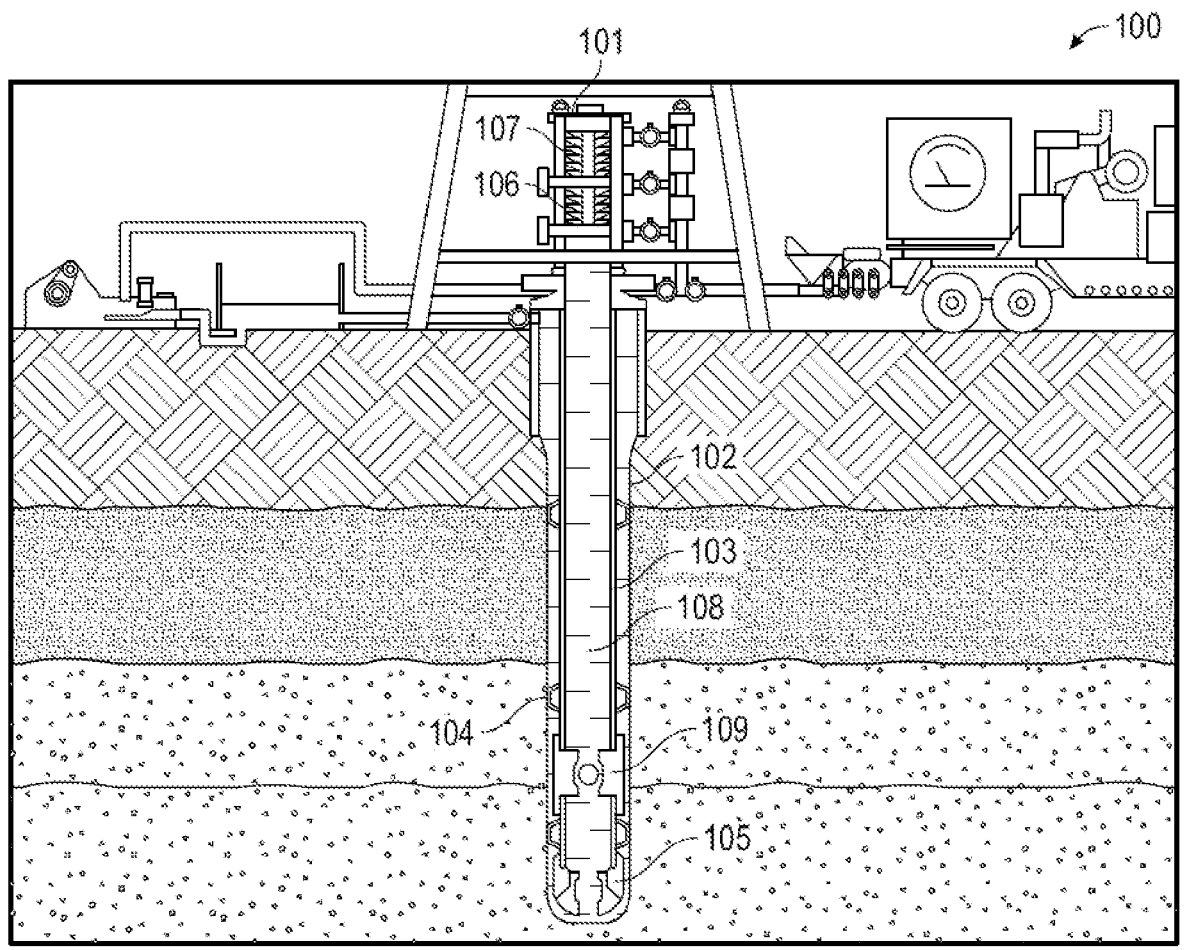
FIG. 1 shows a typical wellsite configuration during a cementing operation.
Figure 2:
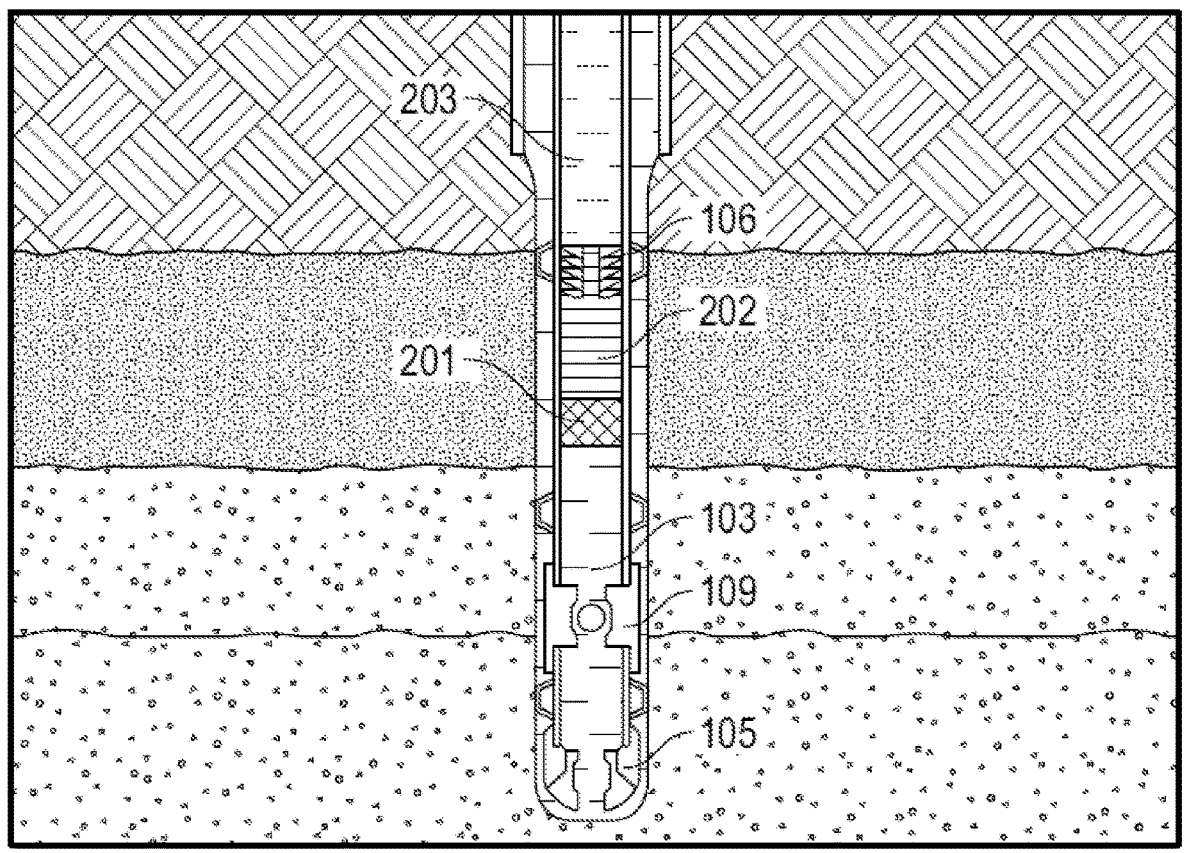
FIG. 2 shows a cementing operation in progress. The bottom cementing plug has been released, separating the cement slurry from chemical washes, spacer fluids, and drilling fluid.
Figure 3:
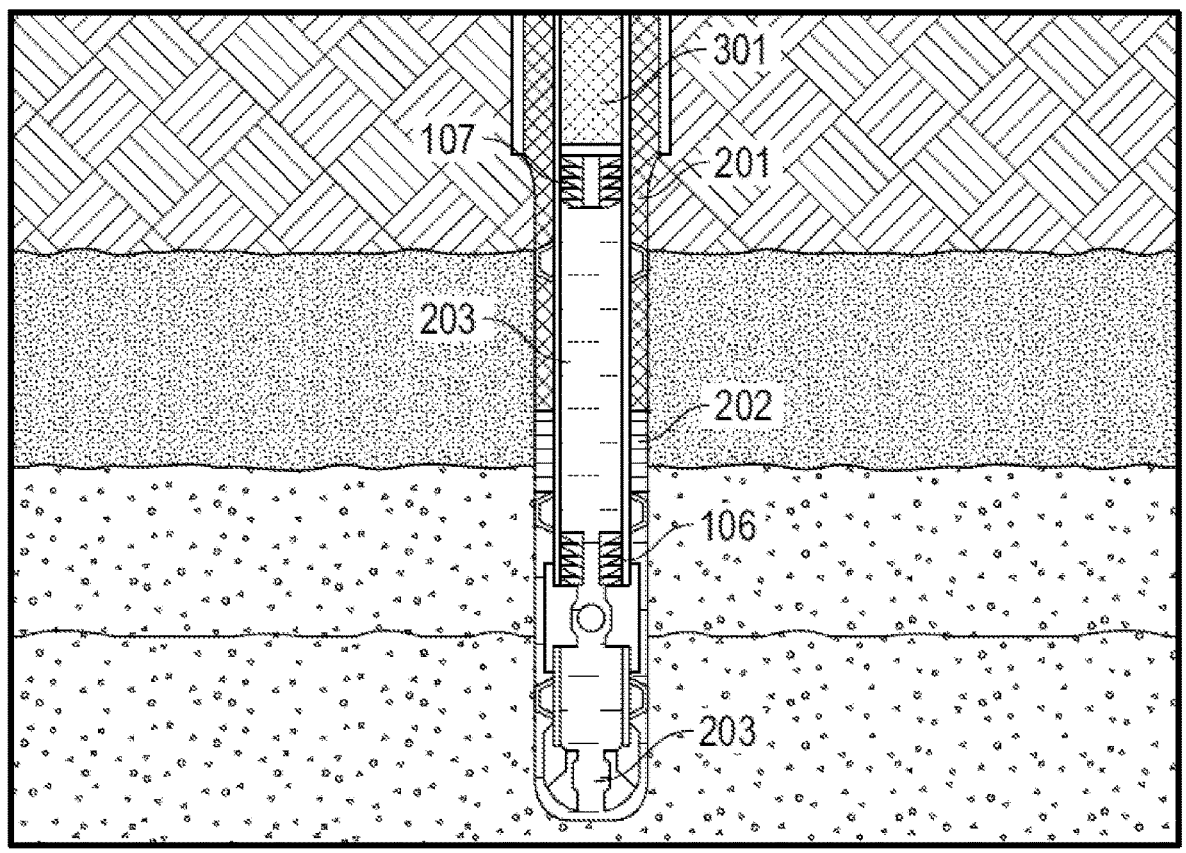
FIG. 3 shows a cementing operation in progress. The bottom cementing plug has landed on the float collar. A membrane in the bottom cementing plug ruptures, allowing cement slurry to enter the annulus between the casing string and the borehole wall.
Figure 4:
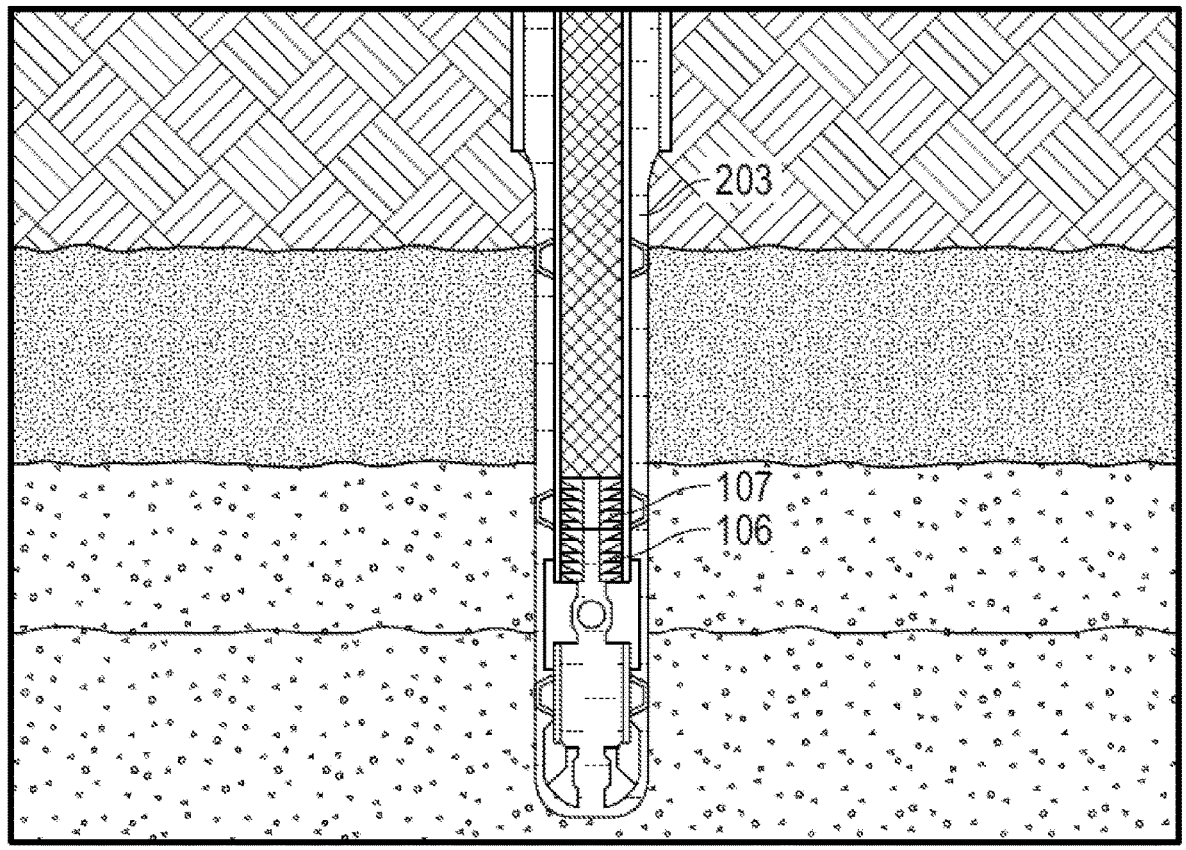
FIG. 4 shows a completed cementing operation. Cement slurry fills the annulus, both cementing plugs have landed on the float collar, and the interior of the casing string is filled with displacement fluid.

In an aspect, embodiments relate to methods for performing a primary cementing operation, whereby a cement slurry is placed in an annular region between a casing and a formation wall. A fluid pill is injected inside the interior of the casing string. The fluid pill comprises reactants that cause an exothermic reaction to take place. The exothermic reaction takes place inside the casing interior, thereby heating the cement slurry and reducing the setting time of the cement slurry.

In a further aspect, embodiments relate to methods for performing a squeeze cementing operation, whereby a cement slurry is pumped into one or more perforations in the casing string, and forced into the annulus between the casing and the formation wall, or into the formation matrix, or both. A fluid pill is injected inside the casing string interior adjacent to the one or more perforations. The fluid pill comprises reactants that cause an exothermic reaction to take place. The exothermic reaction takes place, thereby heating the cement slurry and reducing the setting time of the cement slurry.

In a further aspect, embodiments relate to methods for performing a plug cementing operation, whereby a cement slurry is placed in a portion of an open borehole or in a portion of a casing interior. A fluid pill is injected such that it rests on top of the cement slurry. The fluid pill comprises reactants that cause an exothermic reaction to take place. The exothermic reaction takes place inside the casing interior, thereby heating the cement slurry and reducing the setting time of the cement slurry.

DETAILED DESCRIPTION

At the outset, it should be noted that in the development of any such actual embodiment, numerous implementations—specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary of the disclosure and this detailed description, each numerical value should be read once as modified by the term "about"

(unless already expressly so modified), and then read again as not so modified unless otherwise indicated in context. Also, in the summary of the disclosure and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific points, it is to be understood that inventors appreciate and understand that any and all data points within the range are to be considered to have been specified, and that inventors possessed knowledge of the entire range and all points within the range.

This disclosure pertains to methods for reducing the WOC time during various well cementing operations.

In an aspect, embodiments relate to methods for performing a primary cementing operation, whereby a cement slurry is placed in an annular region between a casing and a formation wall. A fluid pill is injected inside the interior of the casing string. The fluid pill comprises reactants that cause an exothermic reaction to take place. The exothermic reaction takes place inside the casing interior, thereby heating the cement slurry and reducing the setting time of the cement slurry. In the context of the present disclosure, the term "reactants" conveys materials that, when present in the fluid pill, cause an exothermic process to take place. Thus, the reactants may interact to form different chemical compounds, or the reactants may generate heat as they dissolve or become diluted by another fluid.

In a further aspect, embodiments relate to methods for performing a squeeze cementing operation, whereby a cement slurry is pumped into one or more perforations in the casing string, and forced into the annulus between the casing and the formation wall, or into the formation matrix, or both. A fluid pill is injected inside the casing string interior adjacent to the one or more perforations. The fluid pill comprises reactants that cause an exothermic reaction to take place. The exothermic reaction takes place, thereby heating the cement slurry and reducing the setting time of the cement slurry.

This method may also be employed during plug-and-abandonment (P & A) operations involving production tubing. A coiled tubing string may be inserted, forming an annulus between the tubing and the casing interior. A packer may be installed in the annulus below the perforations. Cement slurry may then be squeezed through the perforations to seal productive zones. Once the slurry has been placed around the production tubing, the inside of the coiled tubing may be filled with the reactive fluid pill to generate heat and accelerate setting and hardening of the cement slurry.

In a further aspect, embodiments relate to methods for performing a plug cementing operation, whereby a cement slurry is placed in a portion of an open borehole or in a portion of a casing interior. A fluid pill is injected such that it rests on top of the cement slurry. The fluid pill comprises reactants that cause an exothermic reaction to take place. The exothermic reaction takes place inside the casing interior, thereby heating the cement slurry and reducing the setting time of the cement slurry.

For all aspects of the present disclosure, the fluid pill may comprise one or more reactant systems.

Suitable reacting systems are those fulfilling the generic chemical reaction:

$$\text{Reactants} \longrightarrow \text{Products} \quad \Delta Hr < 0,$$

where a negative value of the enthalpy of reaction $\Delta Hr$ defines an exothermic reaction. In more detail, the generic chemical reaction above can be further described according to the equation:

$$a1\ R1 + a2\ R2 + a3\ R3 \ldots + ak\ Rk \longrightarrow b1\ P1 + b2\ P2 + b3\ P3 \ldots + bl\ P1,$$

where a1, a2, a3, up to ak are the respective stoichiometric coefficients for reactants R1, R2, R3, up to Rk, and where b1, b2, b3, up to b1 are the respective stoichiometric coefficients for products P1, P2, P3, up to P1.

Specific chemical reactions and chemical processes, such as dissolution and/or dilution suitable for embodiments of this disclosure, are those exothermic reactions and processes where the enthalpy of reaction or process is negative. As discussed earlier, such chemicals are, in the context of this disclosure, considered to be "reactants." For a generic chemical reaction or process with known chemical nature and stoichiometry of reactants and products, using the Hess rule, the enthalpy of reaction can be estimated from the Enthalpy of Formation of the k reactants $\Delta Hf(Ri)$ and the Enthalpy of Formation of the l products $\Delta Hf(Pj)$ according to the equation:

$$\Delta Hr = \Delta Hf\ (\text{Products}) - \Delta Hf\ (\text{Reactants}),$$

where $\Delta Hf\ (\text{Products}) = \Sigma bj\ \Delta Hf\ (Pj)$ for $j=1$ up to l, that is $$\Delta Hf\ (\text{Products} = b1\Delta Hf\ (P1) + b2\Delta Hf\ (P2) + b3\Delta Hf\ (P3) + \ldots + bl\Delta Hf\ (P1)$$

and where $\Delta Hf\ (\text{Reactants}) = \Sigma ai\ \Delta Hf\ (Ri)$ for $i=1$ up to k, that is $$\Delta Hf\ (\text{Reactants}) = a1\Delta Hf\ (R1) + a2\Delta Hf\ (R2) + a3\Delta Hf\ (R3) + \ldots + ak\ \Delta Hf\ (Rk).$$

Values of Enthalpy of Formation of chemical substances are readily available—for instance from sources such as the work of the "Committee on Data for Science and Technology" CODATA. Such data may also be found in Section 5 of The Handbook of Chemistry and Physics, (CRC Press, 83$^{rd}$ edition, 2002-2003).

Generic Chemical Processes and Reactions resulting in heat generation that can be used to produce an effect such as required in the disclosure could be:

dissolution of chemicals, notably salts, where the Enthalpy of Dissolution is negative; dilution of chemical product solutions where the Enthalpy of Dilution is negative; acid-base neutralization reactions where the Enthalpy of Reaction is negative (e.g., $AlCl_3$ and CaO);

oxidation reduction (REDOX) reactions where the Enthalpy of Reaction is negative; and polymerization reactions where the Enthalpy of Reaction is negative.

Of course, considerations related to solubility, chemical and process safety, HSE, cost, reactant availability, temperature, pressure, and required chemical volumes will dictate the practical suitability of various chemical reactions.

One fluid system may comprise an ammonium salt and a nitrite salt.

For the ammonium counterions $T^{n-}$ of valence n where n is an integer between 1 and 4 and for the nitrite counterions $Z^{m+}$ of valence m where m is an integer between 1 and 4, the relevant idealized chemical reaction is shown below.

$$m\ [NH_4]_n T + n\ Z[NO_2]_m \longrightarrow (n*m)N_2 + Z_n T_m 2*n*m\ H_2O,$$

In embodiments where both the ammonium salt and the nitrite salt are monovalent, the idealized chemical reaction is shown below.

where X may comprise a halide anion, a nitrate anion or a hydroxyl anion; and Y may comprise a monovalent metal cation. For example, X may be Cl⁻ and Y may be Na⁺.

Alternatively, the fluid pill may comprise ammonium hydroxide and calcium nitrite.

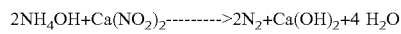

In embodiments the fluid pill may further comprise a catalyst such as hydrochloric acid, acetic acid, formic acid, nitric acid, nitrous acid, phosphoric acid, methane sulfonic acid, propionic acid, and the like. In embodiments the fluid pill may further comprise a corrosion inhibitor. It should also be noted that the above reactions may cause a pressure increase in the wellbore owing to the elevated temperature and generation of nitrogen gas.

Another fluid pill system may comprise water soluble metals, such as lithium, sodium, potassium, rubidium, beryllium, magnesium, calcium, aluminium, and the like, and their alloys. The oxidation and further dissolution of solid metals in water generates heat. The rate at which heat is generated may be controlled by adjusting the particle size of the metals, and by changing the composition of the metal alloys. Larger granules will react more slowly. Another method to delay the metal oxidation is by encapsulation. The coating may be designed to dissolve slowly or to melt at a given temperature.

Another fluid pill system may comprise calcium chloride. The dissolution of solid calcium chloride or magnesium chloride in water generates heat. The rate at which heat is generated may be controlled by adjusting the particle size of the salts. Larger granules will react more slowly. Another method to delay the salt dissolution is by encapsulation. The coating may be designed to dissolve slowly or to melt at a given temperature.

Yet another fluid pill system may employ an acid neutralization reaction; for example, mixing sodium hydroxide and hydrochloric acid, resulting in the generation of heat.

Yet another fluid pill system may employ a polymerization reaction where a monomer reacts to form a polymer, resulting in the generation of heat. A non-limiting example of a polymerization that can be used includes the condensation reaction in aqueous dispersion between phenol and formaldehyde and the resulting heat and product are included in the treatment fluid. In another example, the addition of one or more of monomers selected from acrylamide and derivatives, methacrylamide and derivatives, acrylic acid and acrylate salts, methacrylic acid and methacrylate salts, vinyl sulfonic acid and vinyl sulphonate salts, N-vinylpyrrolidone, vinyl phosphonic acid and vinyl phosphonate salts, diallyldimethylammonium chloride (DADMAC), and the like. Of particular interest are water soluble acrylate and methacrylate esters, such as dimethylaminoethyl methacrylate, ethylene glycol acrylate and ethylene glycol methacrylate, diethyleneglycol acrylate and diethyleneglycol methacrylate, polyethyleneglycol acrylate and polyethylene glycol methacrylate, acrylic, methacrylic vinyl sulfonate and vinyl phosphonate esters, and the like.

Given the aqueous nature of cement slurries and displacement fluids, the majority of the embodiments in this application may be focused on aqueous reactive fluids. In embodiments, the reacting fluid pill may need to be physically separated from the displacement fluid (brine or water).

Where the difference in density between the fluids may not be sufficient to achieve this objective, the use of non-aqueous reactive fluids that are immiscible with the water-base displacement fluid may be useful, especially when the reactive fluid is to be placed on top of a column of displacement fluid. This technique may ensure effective location of the reactive pill in front of the target casing section. Also, the use of non-aqueous fluids may provide additional benefits in terms of corrosion prevention of the inner casing.

Non aqueous reactive pills may be organic solvent based pills where the chemical reaction, dilution or dissolution involves the use of solvent based chemical reactants, or solutes, and exothermic processes taking place in an organic solvent. Organic solvents of choice may be dictated by the nature of the process, the reactants selected and the expected reaction products, but may include linear aliphatic solvents, cycloaliphatic solvents, aromatic solvents, ketones, amines, ethers, amides, sulfones, sulfamides, alcohols, diesel, naphtha, produced oil and the like, and mixtures thereof.

A non-comprehensive list of non-aqueous exothermic processes includes: acid-base reactions, polymerization reactions, addition reactions, condensation reactions, SN reactions and the like wherein the enthalpy of reaction is negative. Acid-base neutralization reactions of interest for this embodiment may be those where the acid comprises mono carboxylic acids such as formic acid, acetic acid, propionic acid, butyric acids, hexanoic acids, heptanoic acids, octanoic acids, nonanoic acid, neo-nonanoic acid, neodecanoic acid, Versatic™ 9 acid (available from Hexion), Versatic™ 10 acid (available from Hexion), 2-ethyl hexanoic acid, undecanoic acid; saturated fatty acids such as lauric acid, tridecanoic acid, myristic acid, palmitic acid, stearic acid, arachinoic acid, heneicosanoic acid, behenenic acid, lignoceric acid, and the like; mono-unsaturated fatty acids such as myristoleic acid, palmitoleic acid, oleic acid, erucic acid, eicosenoleic acid, and the like; di-unsaturated fatty acids such as linoleic acid, linolaidic acid, docosadienoic acid, and the like; tri-unsaturated fatty acids such as linolenic acid, gamma linolenic acid, icosatrienoic acid, and the like; poly-unsaturated and or omega fatty acids such as stearidonic acid, eicosatetraenoic acid, icosapentaenoic acid, docosapentaenoic acid, docosahexaenoic acid, hydroxy-alkanoic acids such as glycolic acid, lactic acid, hydroxybutyric acid, hydroxyl valeric acid, malic acid, and the like, dicarboxylic acids such as oxalic acid, succinic acid, fumaric acid, malonic acid, glutaric acid, hexanedioic acid, phthalic acid, and the like; acid precursors such as lactones, and anhydrides, and the like.

Acid-base neutralization reactions of interest for this embodiment may be those where the base comprises organic bases such as primary, secondary or tertiary amines and polyamines, such as ethylamine, propylamine, butylamine, hexanediamine, aniline, ethylenediamine, diethylenetriamine, triethylenetetramine, tetraethylenepentamine, phenylene diamine, and the like where the enthalpy of neutralization is negative.

When the difference in density and miscibility between the displacement fluid and the reactive pill is not sufficient to ensure placement of the reactive fluid at the most effective position, the use of viscous spacer fluids separating the displacement fluid and the reactive fluid may be considered. In addition, the use of additional solid spacers (or plugs) may be considered to separate both fluids and to ensure the reactive fluid is placed in front of the casing section where the most effective release of heat is envisioned to enhance cement sheath hydration and reduction of setting time.

For all aspects of the present disclosure, the reactants may be present in the fluid pill at a concentration between 0.01 mol/L and 5.5 mol/L, or between 1.0 mol/L and 4.5 mol/L, or between 2.0 mol/L and 3.0 mol/L.

For the minimization of the WOC, the fluid should be able to increase the temperature of the wellbore and the annulus compared to the pumped fluid temperature. For all aspects of the disclosure, the exothermic reaction may heat increase the temperature of the fluid by up to 400° C., or between 1° C. and 150° C., or between 3° C. and 100° C., or between 5° C. and 70° C. or between 10° C. and 40° C. For all aspects of the disclosure, the exothermic reaction may heat the casing interior to a temperature up to 400° C., or between 10° C. and 300° C., or between 30° C. and 200° C., or between 15° C. and 100° C., or between 20° C. and 50° C.

The exothermic reactions may cause the casing to expand upon heating. After the reactions have taken place and the well cools down, the casing may shrink back to its original dimensions. This may risk the development of a microannulus at the casing/cement interface. Accordingly, the cement slurry may comprise an expanding agent as a preventive measure. The expanding agent may comprise calcium oxide, magnesium oxide or calcium sulfate hemihydrate or combinations thereof. The calcium oxide and magnesium oxide may have been calcined at a temperature between 1500° C. and 2000° C. Expansion of the cement sheath after setting may prevent or mitigate microannulus formation. The expanding agents may be present at a concentration between about 1% and about 40% by weight of cement.

The cement employed to perform the disclosed methods may comprise portland cement, high alumina cement, lime/silica blends, Class F fly ash, Class C fly ash or geopolymers or combinations thereof. Resin-based cements comprising epoxy resin, furan resin or phenolic resin or combinations thereof are also envisioned.

The cement slurries may further comprise additives including accelerators, retarders, extenders, weighting agents, dispersants, fluid-loss additives, gas generating agents, ceramic or glass microspheres, nitrogen, lost circulation additives, antifoam agents and defoaming agents, polymers and foamers.

The cement slurries may have densities between about 9 lbm/gal (1080 kg/m$^3$) and 24 lbm/gal (2870 kg/m$^3$).

Figure 5A:
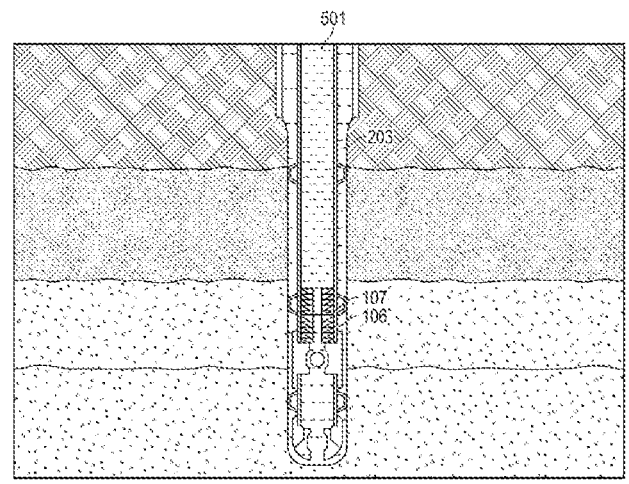
FIGS. 5a and 5b illustrate the disclosed methods in the context of primary cementing.
Figure 5B:
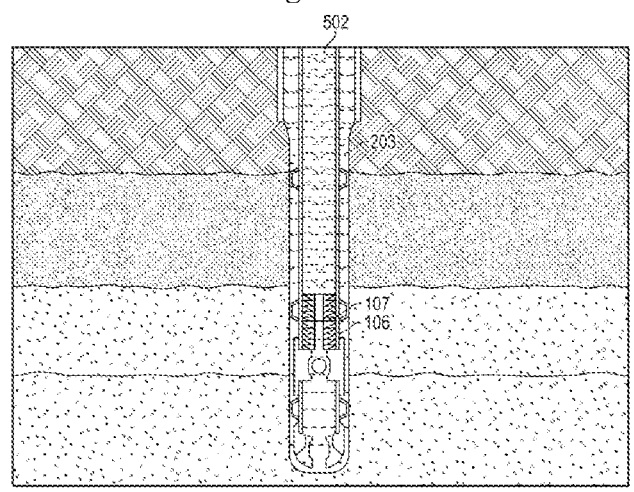

An illustration of the disclosure in the context of primary cementing is given in FIGS. 5a and 5b. FIG. 5a shows the fluid pill being introduced as a displacement fluid 501 behind top cementing plug 107. The subsequent reaction generates heat 502 that is conducted through the casing to the cement slurry 203 and the surrounding formation. It is important to note that, should a "top-up" cementing procedure be necessary as described earlier, the heated displacement fluid may help reduce the WOC time of the slurry introduced into the top of the annulus.

Although FIGS. 5a and 5b depict a "batch" procedure wherein a finite volume of displacement fluid is introduced into the casing interior, Applicant further envisions a "continuous" procedure wherein displacement fluid may be circulated and replenished inside the casing interior. This embodiment may allow maintaining heat generation and conduction as newly supplied reactants are introduced, preventing a temperature decline during the WOC period. This procedure may be accomplished by inserting a conduit such as coiled tubing and pumping fresh displacement fluid into the casing interior.

Figure 6A:
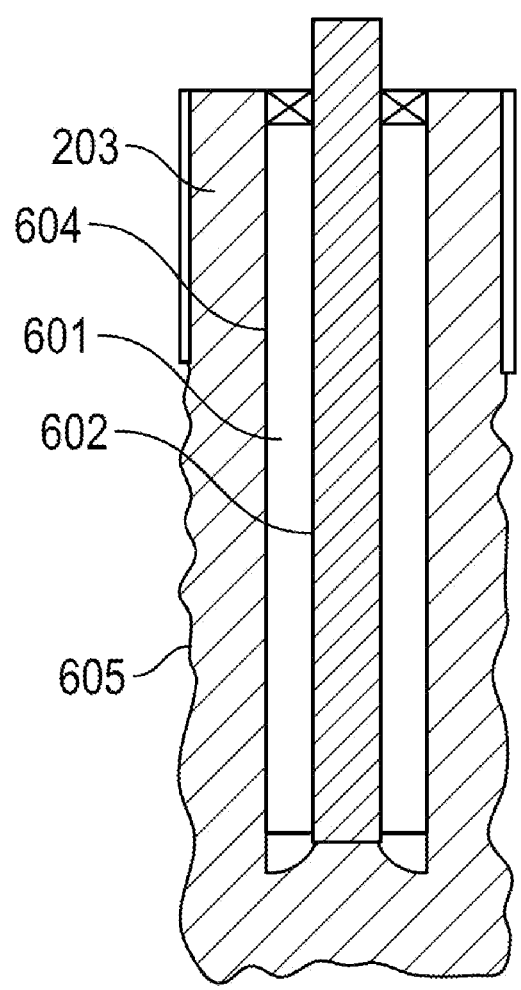
FIGS. 6a and 6b illustrate the disclosed methods in the context of cementing a conductor pipe.
Figure 6B:
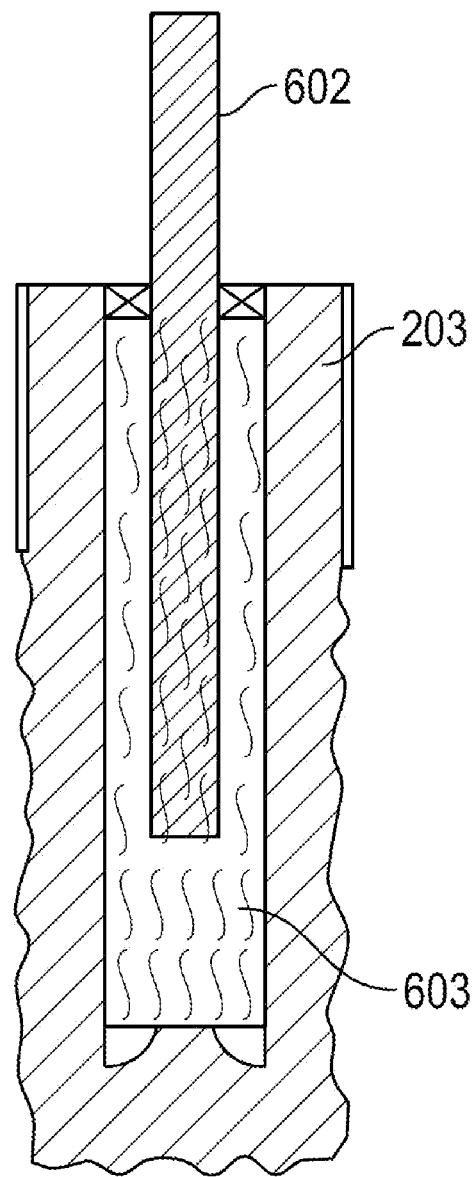

An illustration of the disclosure in the context of cementing a conductor pipe is shown in FIGS. 6a and 6b. FIG. 6a shows the cement slurry 203 between conductor pipe 604 and the formation wall 605. The shading gradient in the cement slurry shows that the setting process in the annulus is uneven. A "stinger" 602, which may be a section of drill pipe or coiled tubing, is inserted in the interior of the casing 601. FIG. 6b shows the fluid pill 603 being injected into the casing interior, and the subsequent reactions generating heat and causing the cement slurry to set from top to bottom.

Figure 7A:
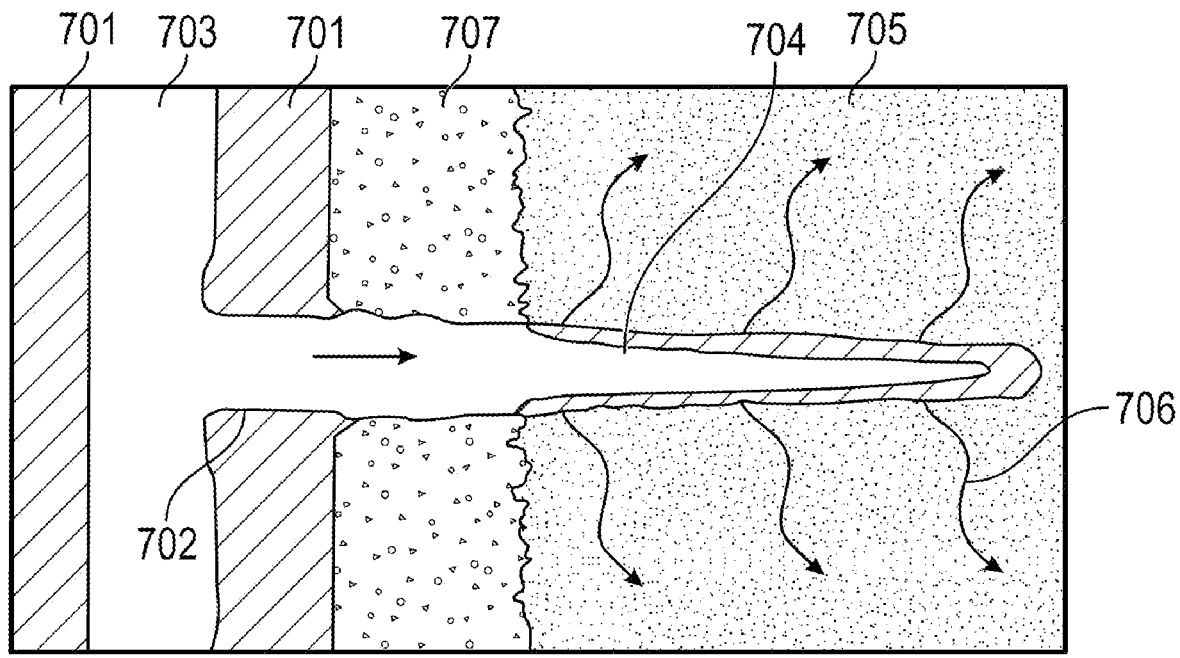
FIGS. 7a and 7b illustrate the disclosed methods in the context of squeeze cementing.
Figure 7B:
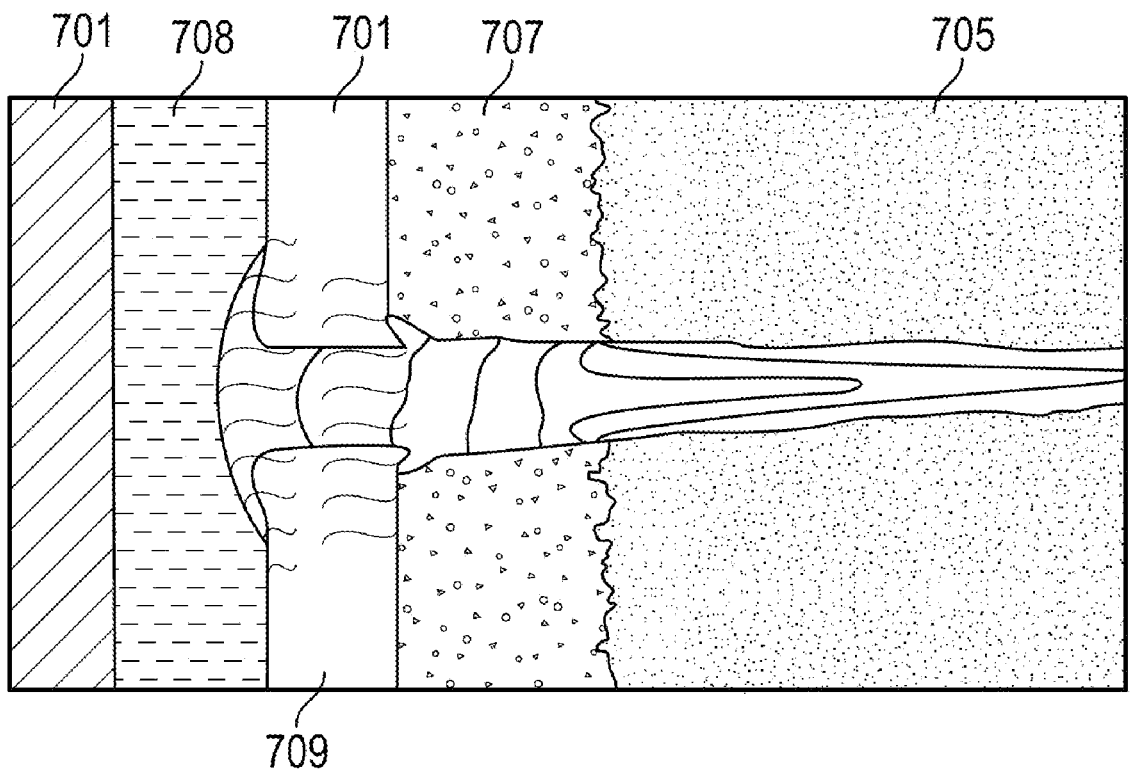

An illustration of the disclosure in the context of squeeze cementing is shown in FIGS. 7a and 7b. FIG. 7a shows the casing 701 with a perforation 702. Cement slurry 703 is being injected through the perforation and primary cement 707 into the perforation tunnel 704 that extends into the formation 705. Cement filtrate 706 leaks off into the formation matrix, leaving a cement filter cake inside the perforation tunnel. FIG. 7b shows a reactive fluid pill 708 in the casing adjacent to the perforation. Heat 709 is transmitted to the cement slurry 703, causing an acceleration of setting and hardening.

Figure 8A:
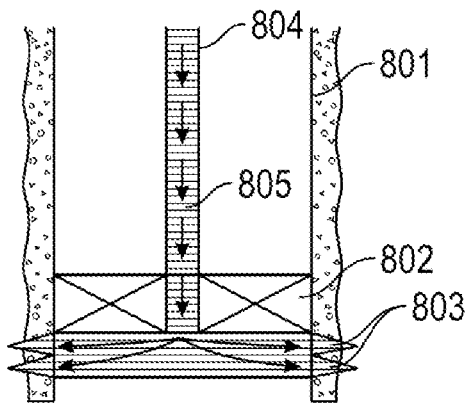
FIGS. 8a-8c illustrate an alternative squeeze cementing embodiment making use of a cementing retainer in the casing.
Figure 8B:
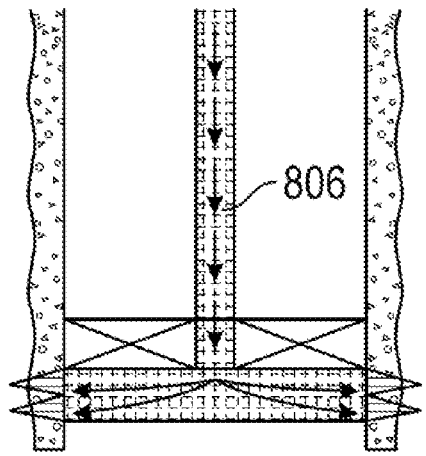
Figure 8C:
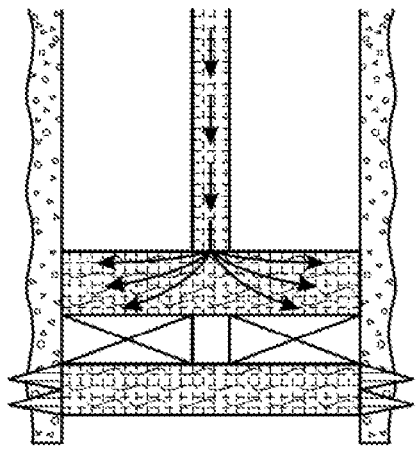

In another embodiment related to squeeze cementing (FIGS. 8a-8c), the casing 801 interior may be isolated by a cementing retainer 802, below which are perforations 803 to be squeezed. A tubing string 804, which may be drillpipe or coiled tubing, is inserted through the retainer, and a cement slurry 805 is injected into the perforations (FIG. 8a). Next, a reactive fluid pill 806 is employed as a displacement fluid and placed behind the cement slurry (FIG. 8b). Then, the tubing string is pulled out of the retainer, and the reactive displacement fluid is placed above the retainer (FIG. 8c). Heat is liberated above and below the retainer, resulting in an acceleration of cement setting and hardening.

Figure 9A:
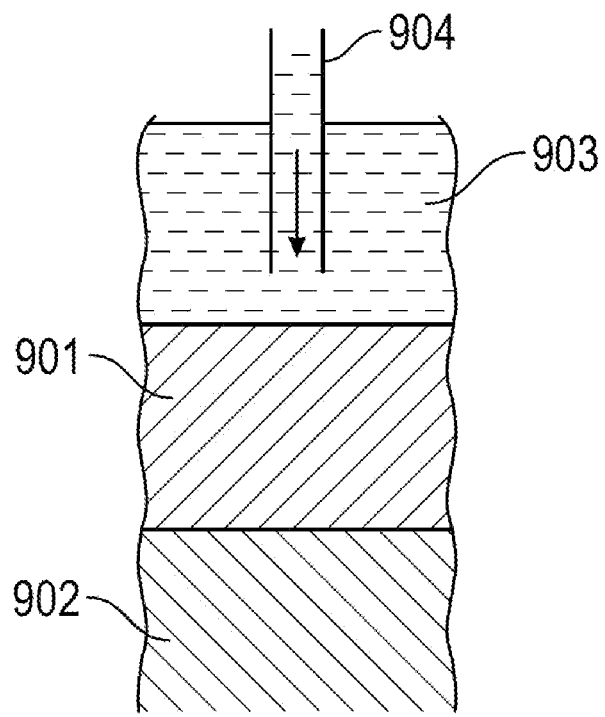
FIGS. 9a and 9b illustrate the disclosed methods in the context of plug cementing.
Figure 9B:
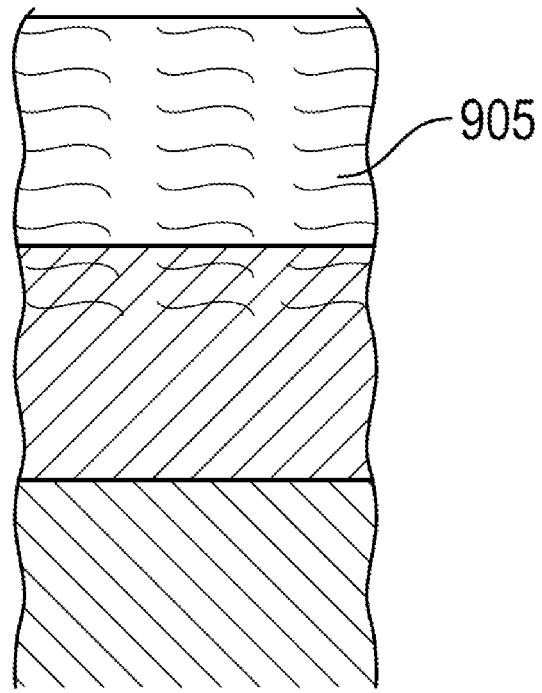

An illustration of the disclosure in the context of plug cementing is shown in FIGS. 9a and 9b. FIG. 9a shows a volume of cement slurry 901 resting on a viscous fluid support 902 in an open hole. A reactive fluid pill 903 is being injected above the cement slurry by a drill pipe or coiled tubing 904. In FIG. 8b, the tubing has been removed, the reaction has begun and heat 905 is being transmitted to the cement slurry.

EXAMPLES

Example 1

A fluid 1a for use according to the disclosure was formulated by admixing ammonium chloride and deionized water to a concentration of 5.0 mol/L NH$_4$Cl.

A fluid 1b for use according to the disclosure was formulated by admixing sodium nitrite and deionized water to a concentration of 5.5 mol/L NaNO$_2$.

A fluid 1c for use according to the disclosure was formulated as 100% Deionized water.

A fluid 1d for use according to the disclosure was formulated by admixing glacial acetic acid and deionized water to a concentration of 50 wt % (8.8 mol/L CH$_3$COOH).

Example 2

A fluid 2a for use according to the disclosure was formulated by admixing: 70.6 mL of the ammonium chloride solution 1a of Example 1 with 58.0 mL of the sodium nitrite solution 1b of Example 1, 21.6 mL of deionized water 1c of Example 1, and 0.45 mL of the acetic acid Solution 1d of Example 1 at an initial ambient temperature of 20.9° C.

The reaction mixture fluid 2a was allowed to react without external agitation in batch mode in a closed stainless steel reactor at an initial pressure of 50 psi for a period of 2 hours, and the maximum temperature of the reaction mixture, and the time at which this maximum temperature was reached were measured. The maximum temperature reached was recorded at 113.6° C. after 21.4 minutes, as shown in Table 1.

Example 3

A fluid 3a for use according to the disclosure was formulated by admixing: 70.6 mL of the ammonium chloride solution 1a of Example 1 with 58.0 mL of the sodium nitrite solution 1b of Example 1, 22.0 mL of deionized water 1c of Example 1, and 0.45 mL of the acetic acid Solution 1d of Example 1 at an initial ambient temperature of 21.0° C.

The reaction mixture fluid 3a was allowed to react without external agitation in batch mode in a closed stainless steel reactor at an initial pressure of 50 psi for a period of 2 hours, and the maximum temperature of the reaction mixture, and the time at which this maximum temperature was reached were measured. The maximum temperature reached was recorded at 112.7° C. after 21.0 minutes, as shown in Table 1. Comparison of this result with the maximum temperature reached by allowing to react fluid 2a as per Example 2 indicates the experimental protocol can allow one to effectively determine the extent and timing of the exotherm with an acceptable accuracy.

Example 4

A series of fluids 4a through 4cc for use according to the disclosure were formulated by admixing varying volumes of the ammonium chloride solution 1a of Example 1 with varying volumes of the sodium nitrite solution 1b of Example 1, varying volumes of the deionized water 1c of Example 1, and varying volumes of the acetic acid solution 1d of Example 1 at varying initial ambient temperatures, according to Table 1. The reaction mixture fluids were allowed to react without external agitation in batch mode in closed a stainless steel reactor at an initial pressure of 50 psi for a period of 2 hours, and the maximum temperature of the reaction mixture, and the time at which this maximum temperature was reached were measured. The values for each experiment are given in Table 1.

TABLE 1

Experiments performed according to Examples 2, 3, and 4.

| Fluid ID | Volume fluid 1a (mL) | Volume fluid 1b (mL) | Volume fluid 1c (mL) | Volume fluid 1d (mL) | $T_0$ (° C.) | $T_{max}$ (° C.) | $\Delta T$ (° C.) | Time at $T_{max}$ (min) |
|---|---|---|---|---|---|---|---|---|
| 2a | 70.6 | 58.0 | 21.6 | 0.45 | 20.9 | 113.6 | 92.7 | 21.4 |
| 3a | 70.6 | 58.0 | 22.0 | 0.45 | 21.0 | 112.7 | 91.7 | 21.0 |
| 4a | 82.0 | 68.0 | 0.0 | 0.90 | 20.7 | 151.6 | 130.9 | 7.3 |
| 4b | 65.6 | 54.4 | 30.4 | 0.90 | 21.3 | 107.8 | 86.5 | 16.8 |
| 4c | 54.7 | 45.3 | 50.2 | 0.90 | 21.1 | 70.8 | 49.7 | 30.3 |
| 4d | 82.0 | 68.0 | 0.0 | 0.60 | 21.2 | 153.1 | 131.9 | 9.1 |
| 4e | 65.6 | 54.4 | 30.0 | 0.60 | 22.7 | 101.2 | 78.5 | 22.8 |
| 4f | 73.8 | 61.2 | 15.8 | 0.90 | 21.1 | 129.5 | 108.4 | 14.1 |
| 4g | 74.0 | 61.0 | 15.1 | 0.60 | 20.9 | 131.8 | 110.9 | 10.8 |
| 4h | 74.0 | 61.0 | 15.2 | 0.30 | 20.3 | 142.2 | 121.9 | 20.3 |
| 4i | 82.0 | 68.0 | 0.0 | 0.30 | 21.6 | 115.1 | 93.5 | 29.0 |
| 4j | 65.6 | 54.4 | 30.0 | 0.30 | 21.9 | 85.8 | 63.9 | 41.3 |
| 4k | 82.0 | 68.0 | 0.0 | 0.45 | 23.0 | 144.0 | 121.0 | 12.0 |
| 4l | 74.0 | 61.0 | 15.0 | 0.45 | 23.0 | 125.8 | 102.8 | 17.3 |
| 4m | 65.6 | 54.4 | 29.6 | 0.45 | 23.0 | 98.1 | 75.1 | 23.2 |
| 4n | 70.6 | 58.0 | 22.1 | 0.60 | 21.1 | 118.7 | 97.6 | 16.3 |
| 4o | 70.6 | 58.0 | 21.8 | 0.30 | 20.8 | 101.3 | 80.5 | 31.3 |
| 4p | 70.6 | 58.0 | 21.6 | 0.75 | 20.8 | 122.4 | 101.6 | 13.6 |
| 4q | 70.6 | 58.0 | 21.5 | 0.90 | 21.3 | 122.7 | 101.4 | 12.3 |
| 4r | 70.6 | 58.0 | 21.5 | 0.60 | 41.1 | 139.8 | 98.7 | 5.9 |
| 4s | 70.6 | 58.0 | 21.8 | 0.30 | 37.4 | 124.7 | 87.3 | 13.7 |
| 4t | 70.6 | 58.0 | 21.4 | 0.45 | 37.5 | 131.4 | 93.9 | 9.3 |
| 4u | 65.6 | 54.4 | 30.0 | 0.60 | 42.9 | 125.2 | 82.3 | 7.1 |
| 4v | 65.6 | 54.4 | 30.0 | 0.30 | 45.2 | 119.3 | 74.1 | 11.4 |
| 4w | 65.6 | 54.4 | 30.0 | 0.45 | 45.5 | 124.2 | 78.7 | 8.3 |
| 4x | 65.6 | 54.4 | 29.9 | 0.60 | 29.6 | 111.8 | 82.2 | 13.6 |
| 4y | 65.6 | 54.4 | 29.9 | 0.45 | 30.3 | 105.3 | 75.0 | 17.6 |
| 4z | 65.6 | 54.4 | 30.2 | 0.30 | 29.5 | 96.5 | 67.0 | 25.8 |
| 4aa | 70.6 | 58.0 | 21.3 | 0.60 | 33.6 | 129.9 | 96.3 | 8.5 |
| 4bb | 70.6 | 58.0 | 21.6 | 0.45 | 31.3 | 122.7 | 91.4 | 13.2 |
| 4cc | 70.6 | 58.0 | 21.5 | 0.30 | 30.7 | 115.6 | 84.9 | 18.2 |

Example 5

Figure 10:
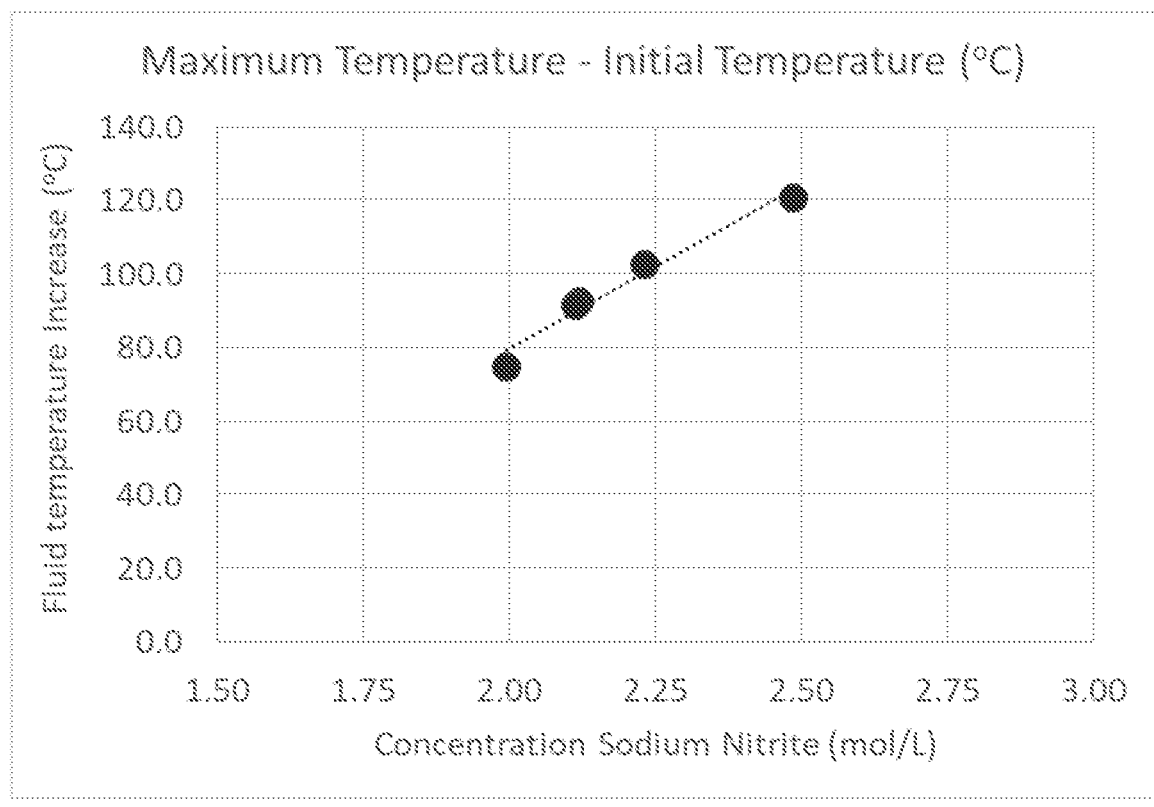
FIG. 10 shows the fluid temperature increase in a fluid system containing ammonium nitrate, sodium nitrite and acetic acid, as a function of sodium nitrite concentration.
Figure 11:
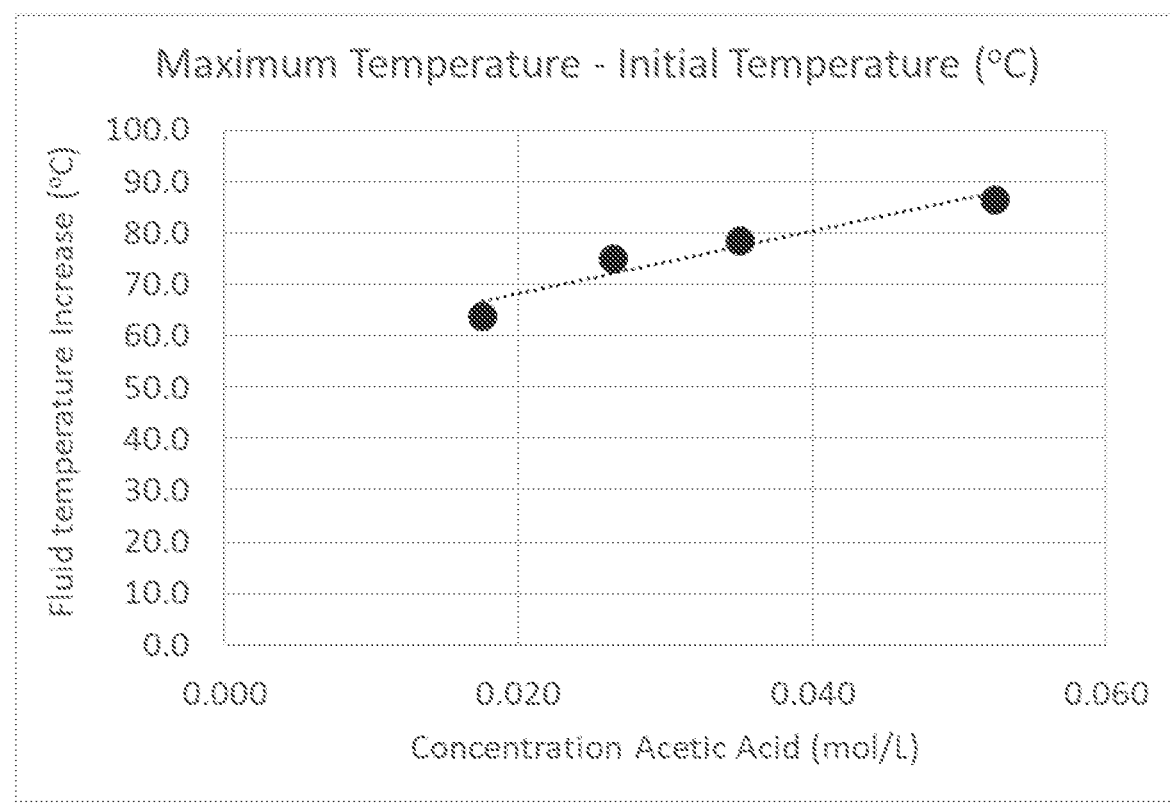
FIG. 11 shows the fluid temperature increase in a fluid system containing ammonium nitrate, sodium nitrite and acetic acid, as a function of acetic acid concentration.
Figure 12:
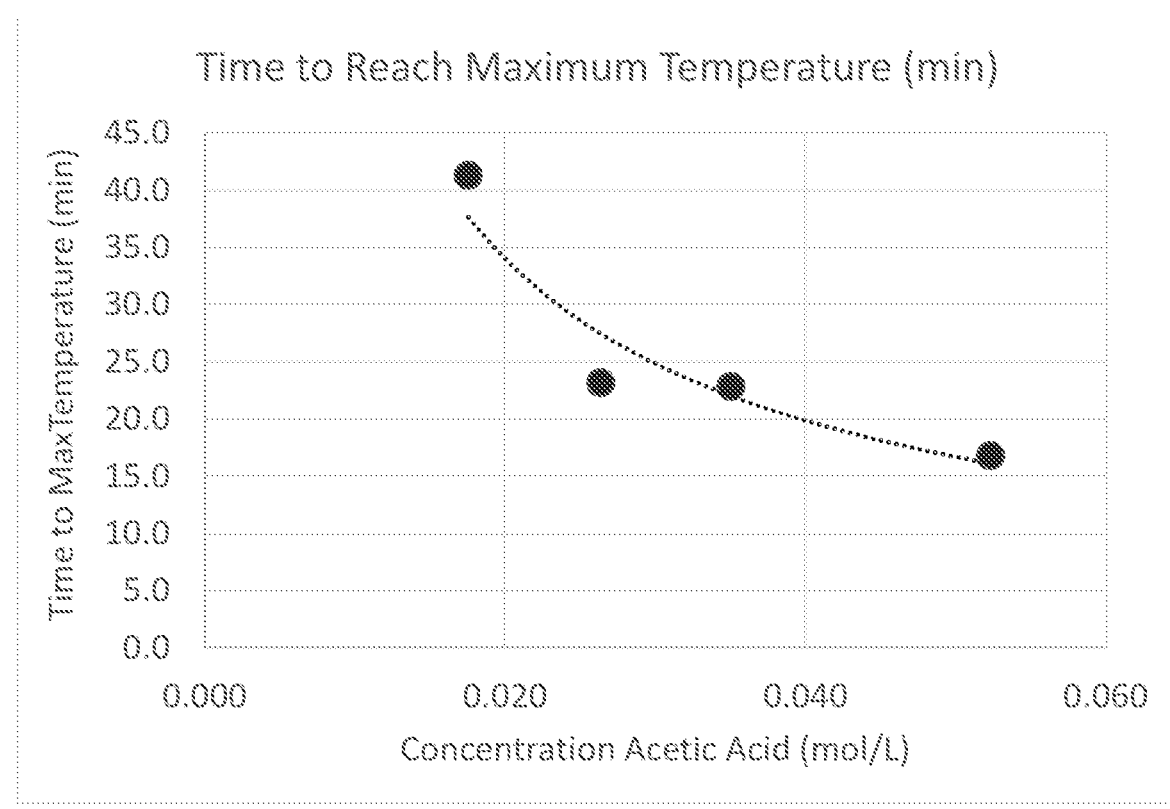
FIG. 12 shows the time to reach maximum temperature in a fluid system containing ammonium nitrate, sodium nitrite and acetic acid, as a function of acetic acid concentration.

Fluid temperature increases as the concentrations of reactants increases. FIG. 10 depicts the observed temperature increase as a function of limiting reactant concentration (nitrite ion) for experiments performed with the same concentration of acetic acid catalyst (0.026 mol/L), and the same molar ratio of ammonium and nitrite ions. FIG. 11 depicts the observed temperature increase as a function of acetic acid concentration, and the same molar ratio of ammonium and nitrite ions (1.10). FIG. 12 depicts the time for the fluid to reach maximum temperature as a function of acetic acid concentration. The time to reach maximum temperature decreases with increasing acetic acid concentration.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

The invention claimed is:

1. A method, comprising:
performing a primary cementing operation, whereby a cement slurry is placed in an annular region between a casing and a formation wall, wherein performing the primary cementing operation comprises:
pumping the cement slurry into the casing; and
displacing, via a displacement fluid, the cement slurry from the casing into the annular region by pumping the displacement fluid into the casing; and
causing an exothermic reaction to take place inside a casing interior, thereby heating the cement slurry and reducing a setting time of the cement slurry, wherein the displacement fluid comprises reactants that cause the exothermic reaction in the casing.

2. The method of claim 1, wherein the reactants comprise an ammonium salt, a nitrite salt, and calcium chloride.

3. The method of claim 1, wherein the reactants comprise sodium hydroxide and hydrochloric acid.

4. The method of claim 1, wherein the reactants are present at a concentration between 0.01 mol/L and 5.5 mol/L.

5. The method of claim 1, wherein the exothermic reaction heats the casing interior to a temperature up to 400° C.

6. The method of claim 1, wherein the cement slurry contains an expanding agent, the expanding agent comprising magnesium oxide, calcium oxide, or calcium sulfate hemihydrate or combinations thereof.

7. The method of claim 1, further comprising, after the displacing of the cement slurry into the annular region, continuously pumping the displacement fluid through the casing for a period of time to maintain an amount of heat generation of the exothermic reaction.

8. A method, comprising:
performing a squeeze cementing operation, whereby a cement slurry is pumped into one or more perforations in a casing and forced into an annular region between the casing and a formation wall, into a formation matrix, or both via a displacement fluid;
injecting a fluid pill inside a casing interior of the casing adjacent to the one or more perforations, the fluid pill comprising reactants that cause an exothermic reaction, wherein the displacement fluid comprises the fluid pill; and
causing the exothermic reaction to take place inside the casing interior, thereby heating the cement slurry and reducing a setting time of the cement slurry.

9. The method of claim 8, further comprising pumping a second fluid pill into the one or more perforations before pumping the cement slurry.

10. The method of claim 8, wherein drill pipe or coiled tubing is employed to inject the fluid pill.

11. The method of claim 8, wherein the reactants comprise an ammonium salt, a nitrite salt, and calcium chloride.

12. The method of claim 8, wherein the reactants comprise sodium hydroxide and hydrochloric acid.

13. The method of claim 8, wherein the reactants are present in the fluid pill at a concentration between 0.01 mol/L and 5.5 mol/L.

* * * * *